United States Patent [19]
Fukuda et al.

[11] Patent Number: 5,676,552
[45] Date of Patent: Oct. 14, 1997

[54] WIRE HARNESS DEVICE FOR INSTRUMENT PANEL

[75] Inventors: Kiyohito Fukuda; Shinji Kodama, both of Shizuoka, Japan

[73] Assignee: Yazaki Corporation, Tokyo, Japan

[21] Appl. No.: 688,787

[22] Filed: Jul. 31, 1996

[30] Foreign Application Priority Data

Aug. 25, 1995 [JP] Japan ................................. 7-217592

[51] Int. Cl.⁶ ................................................ H01R 33/00
[52] U.S. Cl. ........................ 439/34; 174/72 A; 439/369
[58] Field of Search ......................... 439/34, 364, 378, 439/362, 365; 411/424, 173, 166; 174/72 A

[56] References Cited

U.S. PATENT DOCUMENTS 4,815,984  3/1989  Sugiyama et al. ................ 174/72 A
4,942,499  7/1990  Shibata et al. .................... 174/72 A
4,952,166  8/1990  Nagasaka et al. ................. 439/364
5,492,446  2/1996  Hawkins et al. ................... 411/424

FOREIGN PATENT DOCUMENTS 1-142345  9/1989  Japan ............................ B60R 16/02

*Primary Examiner*—Gary P. Paumen
*Assistant Examiner*—Christopher Goins
*Attorney, Agent, or Firm*—Sughrue, Mion, Zinn, Macpeak & Seas, PLLC

[57] ABSTRACT

A multi-polar connectors of a wire harness on a body side which is mounted on a dash board of a motor vehicle, and the multipolar connectors of a wire harness on a panel side which is mounted on an instrument panel, have through-holes through which guiding insertion bolts extended from the dash board are passed, so that those multipolar connectors of the two wire harnesses are engaged with each other simultaneously when the instrument panel is joined to the dash board.

8 Claims, 6 Drawing Sheets

WIRE HARNESS DEVICE FOR INSTRUMENT PANEL

BACKGROUND OF THE INVENTION

1. Field of the Invention

This invention relates to a wire harness device for an instrument panel.

2. Background

Heretofore, in fixedly securing the instrument panel of a motor vehicle to the vehicle body, in order to connect a wire harness on the side of the instrument panel which is mounted on the latter to a wire harness on the side of the vehicle body which is mounted on the dash board, the engagement of connectors at the ends of the wire harness are manually performed after the instrument panel has been fixed. This operation is rather troublesome to the worker, so that the connection is liable to be incomplete or erroneous.

In order to overcome this difficulty, for instance Unexamined Japanese Utility Model Publication No. Hei. 1-142345 as disclosed a wire harness device for an instrument panel which is so designed that the connection of the connectors of wire harnesses is automatically achieved as the instrument panel is combined with the dash board.

FIG. 6 is an exploded perspective view of the above-described wire harness device. A wire harness 33 on the side of the instrument panel 31 is fixedly mounted on the latter 31 in advance. A plurality of branch lines extended from the wire harness 33 are connected to connectors 36. Those connectors 36 are connected to meters, switches, etc. (not shown) mounted on the instrument panel.

Brackets 37 and 38 are mounted on the right and left portions of the rear surface of the instrument panel 31. Those brackets 37 and 38 have connector mounting holes 45, with which groups of connectors 39a, 39a, ... and 39a connected to both ends of the wire harness 33 on the panel side are fixedly engaged. And a pair of dovetail-bar-shaped inserting members 42 are protruded from the inner surfaces of the right and left walls of an opening 41 which is formed for a center console (not shown) in the lower middle of the instrument panel 31.

On the other hand, on the front surface of the dash board 32, a pair of brackets 42 and 43 are mounted in correspondence to the brackets 37 and 38 on the instrument panel, respectively. The brackets 42 and 43 have connector mounting holes 45, with which the connectors 44a and 44b of a harness 34 on the vehicle body side are fixedly engaged. And a pair of guides 40 and 40 having dovetail grooves 41 are protruded from the middle portion of the dash board 32 so as to be engaged with the aforementioned inserting members 42 and 42.

The bracket 42 paired with the bracket 37 is made of a metal plate by pressing or bending as shown in FIG. 7, and it includes insertion guides 46 which are formed by cutting and raising or by bending in such a manner that they are extended from the edges of the bracket body towards the bracket 37. The connectors 44a is so engaged with the connector mounting holes 45 that they are slightly horizontally and vertically movable to absorb the misalignment of the axes of the mating connectors 39a with those of the connectors 44a (hereinafter referred to as "movable connectors 44a", when applicable) which may occur when the connectors 44a and 39a are connected with each other.

All of the connectors 39a of the wire harness 33 on the panel side are simultaneously connected to all of the connectors 39b of the wire harness 34 on the body side, respectively, when the instrument panel 31 is joined to the dash board 32 by moving the inserting members 42 of the instrument panel 31 along the dovetail grooves 41 of the guides 40. During engagement of those connectors, the misalignment of the axes of the connectors 39a (44a) with those of the connector 39b (44b) can be absorbed by designing either the connectors 39a or the connector 44a (either 39b or 44b) as the above-described movable connectors. This feature makes it possible to smoothly achieve the assembling work, and to lower the accuracy in positioning those connectors 39a, 39b, 44a and 44b in the connector mounting holes 45 and 47.

Hence, the above-described wire harness device is able to dispense with the manual connection of the connectors 39a, 44a, etc. That is, with the wire harness device, the time and labor required for the assembling work are greatly reduced, and the instrument panel 31 may be automatically joined to the dash board 32 with a mechanical device; that is, the assembling work is improved in productivity.

However, the above-described conventional wire harness device is still disadvantageous in the following points:

In the conventional wire harness device, the connectors 39a and 39b, and the connectors 44a and 44b are extremely small in size when compared with the instrument panel 31. Hence, the play of the guides 40 of the dash board 32 greatly adversely affects the engagement of the connectors 39a, 39b, 44a and 44b.

That is, if the guides are fluctuated in dimensional accuracy, then the instrument panel 31 may be joined to the dash board 32 in such a manner that the former 31 is inclined with respect to the latter 32. In this case, the connectors 39a and 39b are also obliquely engaged with the mating connectors 44a and 44b, respectively. Hence, the insertion guides 46 and the movable connectors cannot absorb the misalignment of the axes of the connectors 39a and 39b with those of the mating connectors 44a and 44b, as a result of which the engagement of those connectors is unsatisfactory.

SUMMARY OF THE INVENTION

Accordingly, an object of the invention is to eliminate the above-described difficulties accompanying a conventional wire harness device for an instrument panel.

More specifically, an object of the invention is to provide a wire harness device for an instrument panel in which the troublesome work is simplified that the connectors of one of the wire harnesses are connected with those of the other wire harness, and the engagements of those connectors is positively achieved.

The foregoing object and other objects of the invention have been achieved by the provision of a wire harness device for an instrument panel; in which, connectors of a first wire harness on the body side which is mounted on the dash board of a motor vehicle, and connectors of a second wire harness on the panel side which is mounted on the instrument panel of the motor vehicle are penetrated by guiding insertion bolts which are extended from the dash board or the instrument panel so as to join the instrument panel to the dash board, and simultaneously when the instrument panel is joined to the dash board, the connectors of the first wire harness are engaged with the connectors of the second wire harness.

In the wire harness device, preferably the connectors of the first wire harness on the body side and the connectors of the second wire harness on the panel side are fixedly mounted on the dash board and the instrument panel, respectively, in advance. Furthermore, it is preferable that, in the wire harness device, the connectors of the first wire harness on the body side and the connectors of the second wire harness on the panel side are prevented from being turned around the guiding insertion bolts. Moreover, it is preferable that, in the wire harness device, nserting members are formed on either the dash board or the instrument panel, and receiving members engageable with the inserting members are formed on the remaining, so that the instrument panel is joined to the dash board while the inserting members being engaged with the receiving members.

DETAILED DESCRIPTION OF THE PREFERRED EMBODIMENTS

Preferred embodiments of the invention will be described with reference to the accompanying drawings.

First Embodiment

Figure 1:
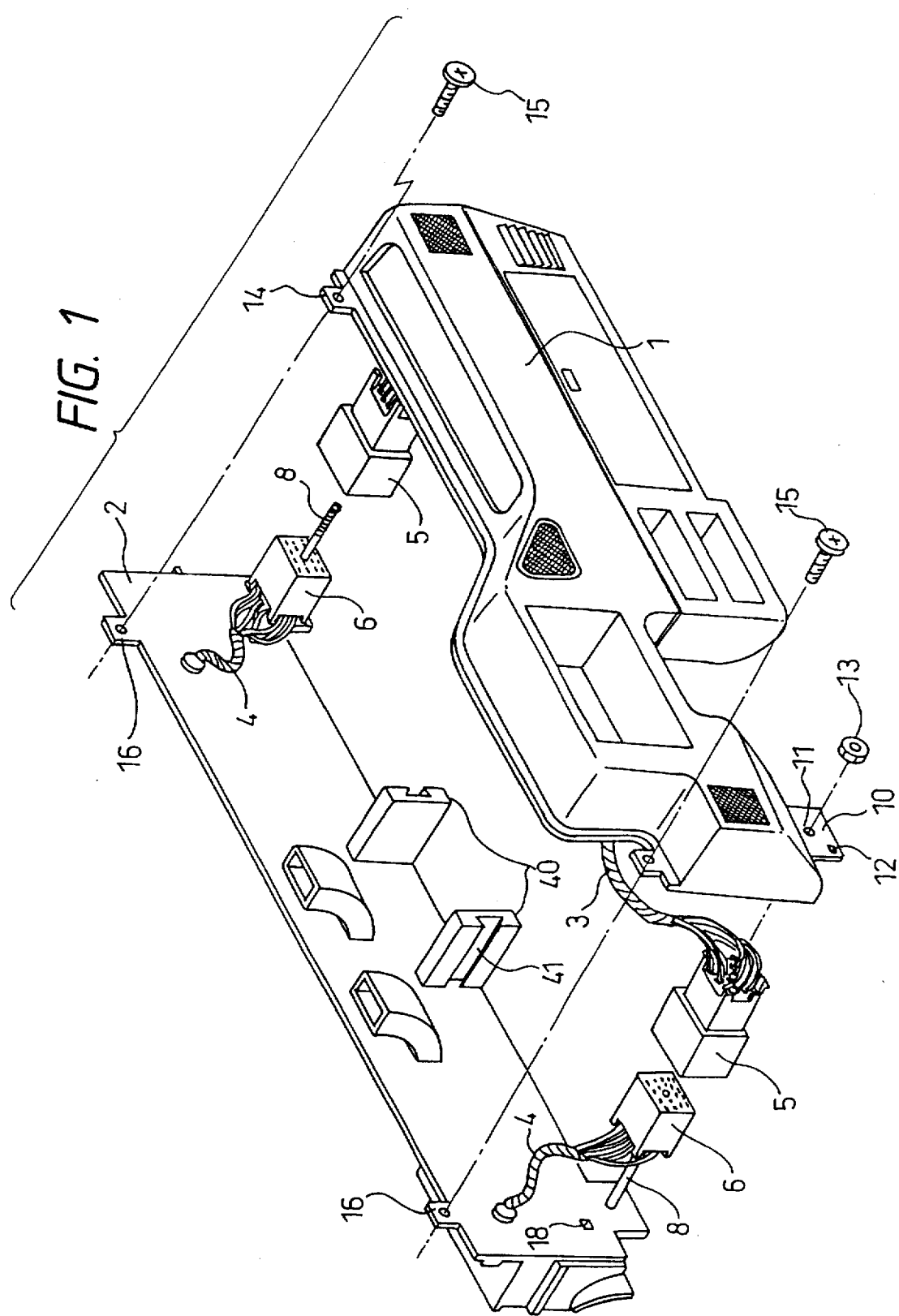
FIG. 1 is an explode perspective view of an example of a wire harness device for an instrument panel of a first embodiment of the invention.

An example of a wire harness device for an instrument panel is shown in FIG. 1.

Figure 6:
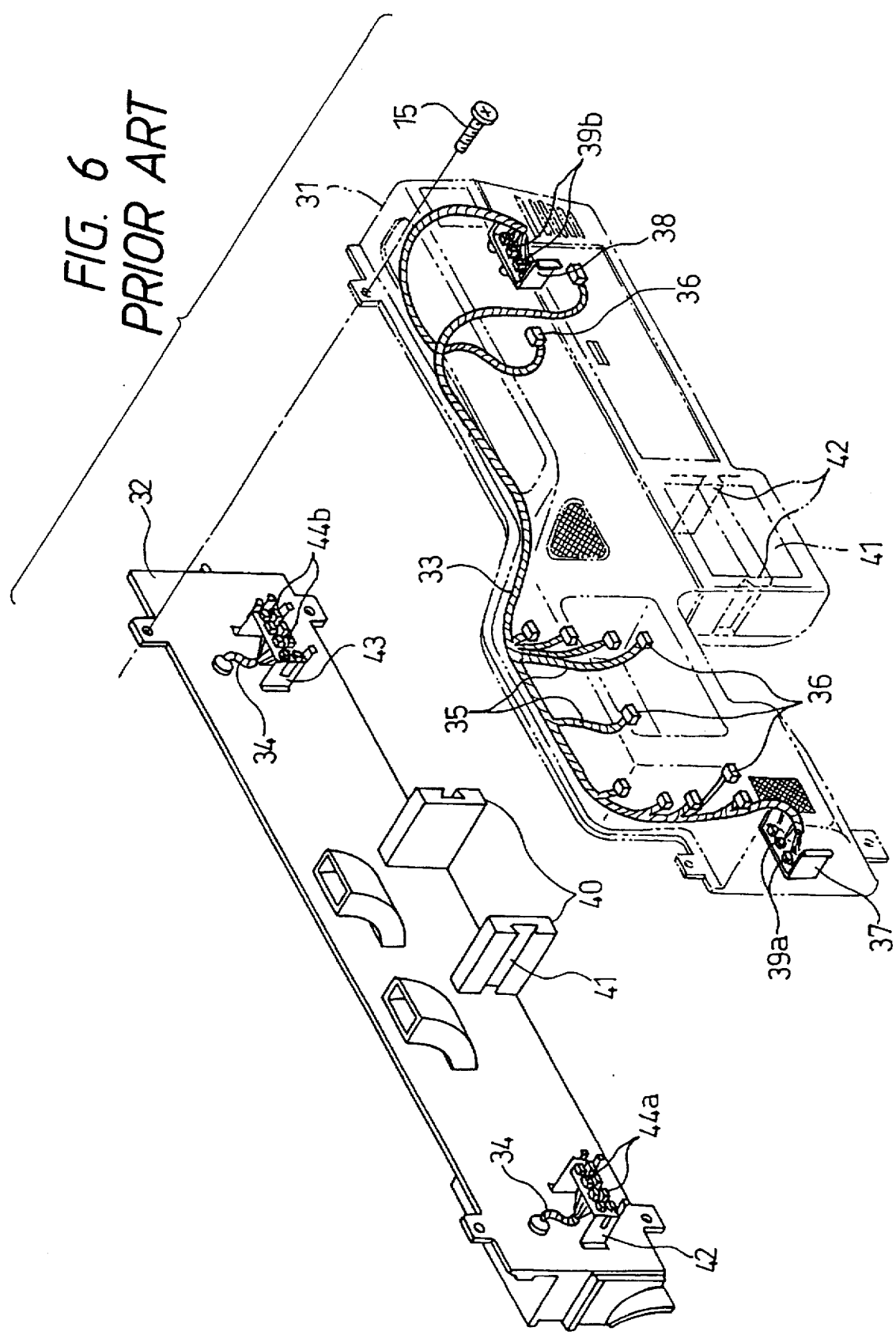
FIG. 6 is an exploded perspective view showing a conventional wire harness device for an instrument panel.
Figure 7:
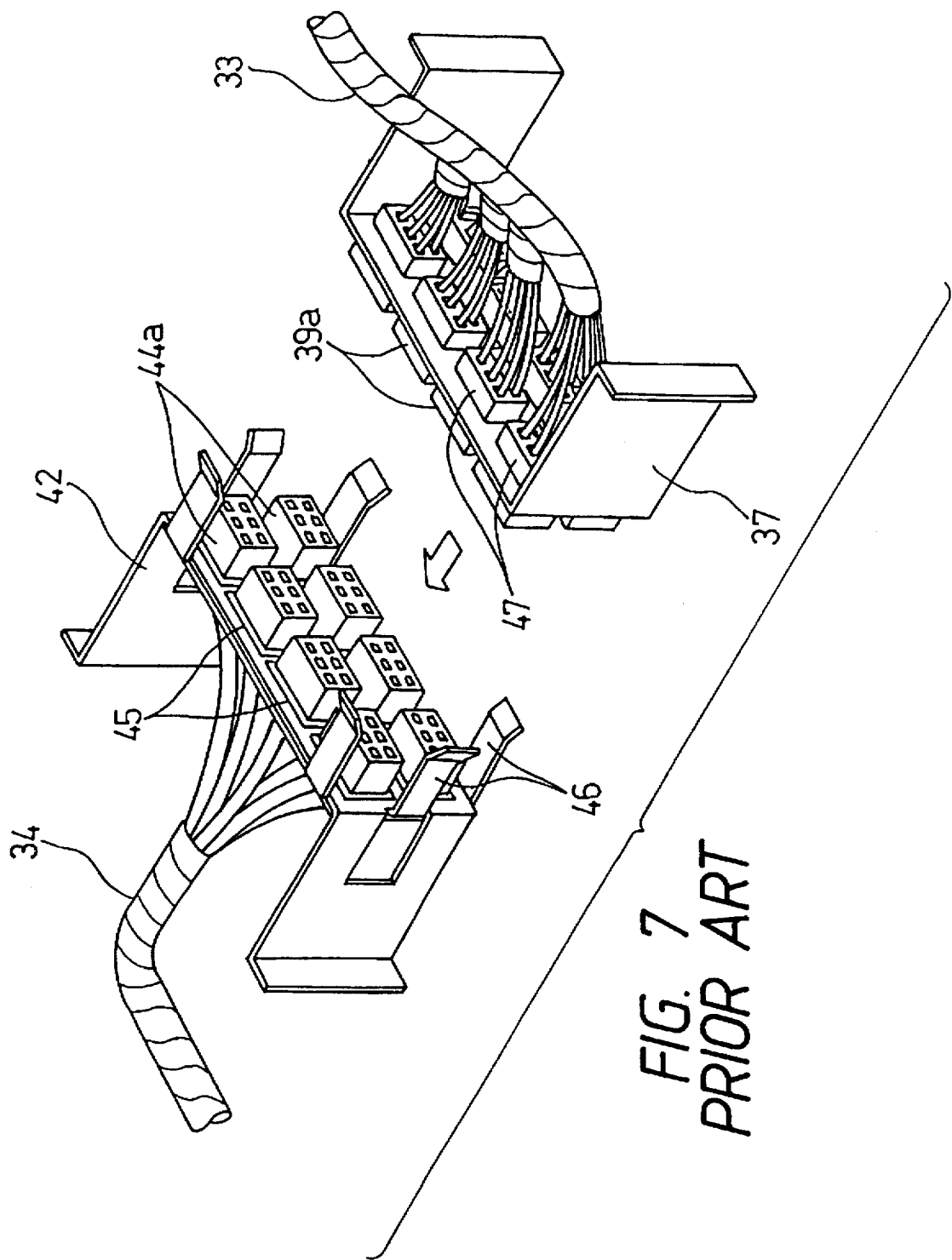
FIG. 7 is an enlarged perspective view showing essential parts of a connector engaging section shown in FIG. 6.

In FIG. 1, reference numeral 3 designates a wire harness on the panel side which is fixedly mounted on the instrument panel 1 in advance. Similarly as in the case of the wire harness on the panel side shown in FIG. 6, connectors connected to the ends of branch lines (not shown) extended from parts of the wire harness 3 are also connected to meters, switches, etc. on the instrument panel in advance.

The instrument panel 1 has a pair of panel fixing ears 14 and 14 on the upper edges of the right and left end portion of its back. Each of the panel fixing ears 14 has a screw insertion hole into which a fixing screw 15 is inserted. Furthermore, the instrument panel 1 has a pair of panel fixing ears 10 and 10 on the lower edges of the right and left end portions of its back. Each of the panel fixing ears 10 has a screw insertion hole 11 and a pair of locking holes 12. Similarly as in the case of the instrument panel 31 shown in FIG. 6, a pair of dovetail-bar-shaped inserting members (not shown) are protruded from the inner surfaces of the right and left walls of an opening which is formed for a center console in the lower middle portion of the instrument panel.

On the other hand, a dash board 2 has a pair of mounting ears 16 and 16 on the upper edges of the right and left end portions of its front in correspondence to the above-described panel fixing ears 14 and 14. The dash board 2 has: a pair of guiding insertion bolts 8 and 8 which are extended from the right and left lower end portions of the front in correspondence to the panel fixing ears 10, respectively; and locking holes 18 which are formed in the right and left lower end portions. In addition, similarly as in the case of the dash board 32 shown in FIG. 6, a pair of guides 40 and 40 having dovetail grooves 41 are protruded from the middle portion of the dash board 2 so as to be engaged with the aforementioned inserting members.

Figure 2:
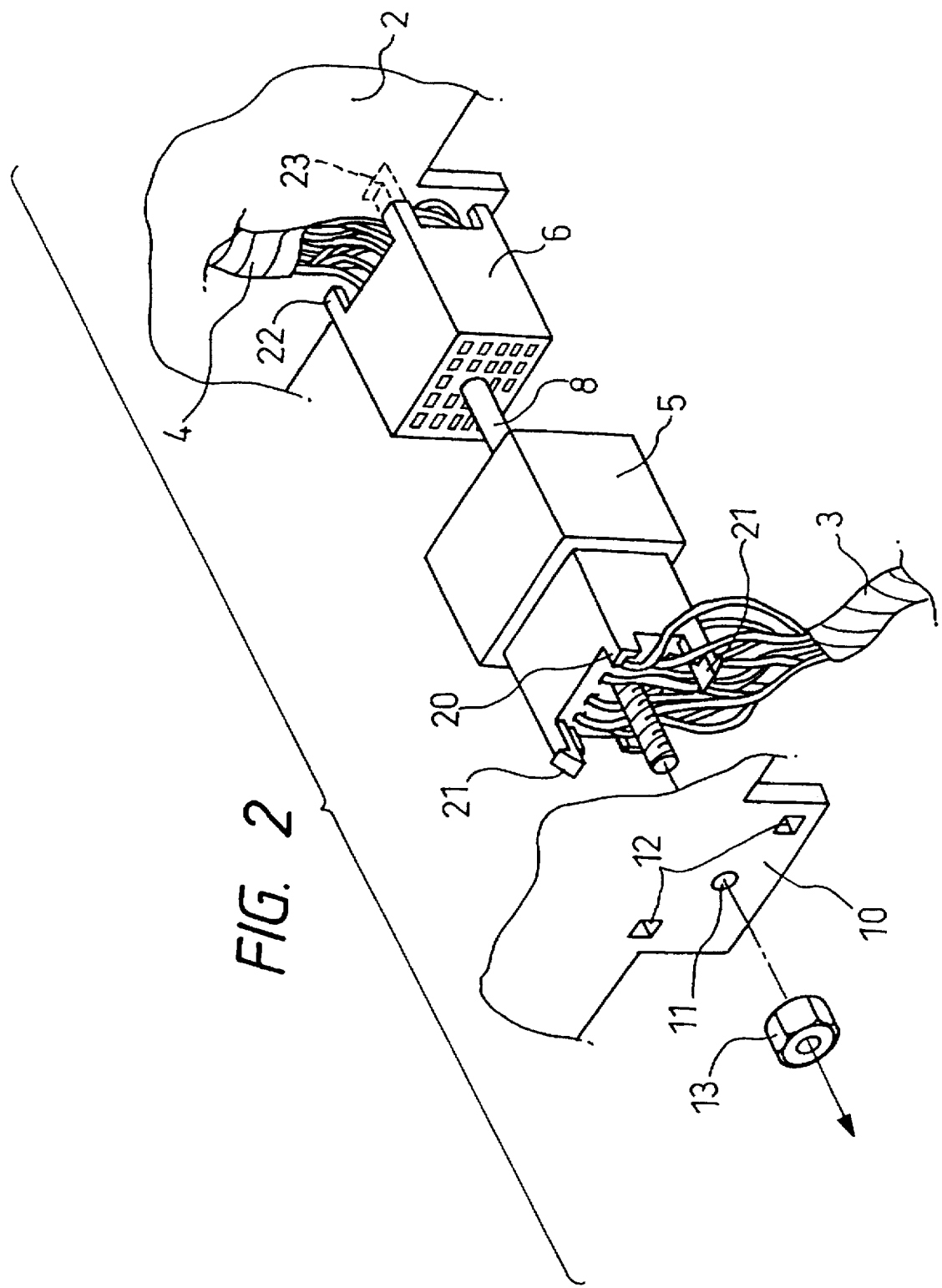
FIG. 2 is an enlarged perspective view for a description of the connection of multi-polar connectors of harnesses shown in FIG. 1.

Both ends of the wire harness 3 on the panel side are connected to multipolar connectors (of female type) 5. As shown in FIG. 2, each of the multipolar connectors 5 has four legs 20 on its back. Of those legs 20, two legs positioned diagonally opposite to each other are different from the remaining; that is, the end portions of the two legs are formed into flexible locking pieces 21, respectively. The flexible locking pieces 21 are engaged with the locking holes 12 and 12, so that the multipolar connector 5 is temporarily mounted on the instrument panel 1. The multipolar connectors 5 have each a through-hole at the center through which the guiding insertion bolt 8 is extended.

On the other hand, similarly as in the case of the wire harness 3, both ends of a wire harness 3 on the body side are connected to multipolar connectors (of male type) 6. Similarly as in the case of the above-described multipolar connectors 5, each of the multipolar connectors 6 has four legs 22 on its back. Of those legs 22, two legs 22 positioned diagonally opposite to each other are different from the remaining; that is, the end portions of the two legs are formed into flexible locking pieces 23, respectively. The flexible locking pieces 23 are engaged with the locking holes 18, so that the multipolar connector 6 is temporarily mounted on the dash board 2. Each of the multipolar connectors 6 also has a through-hole through which the guiding insertion bolt 8 is passed.

Figure 3:
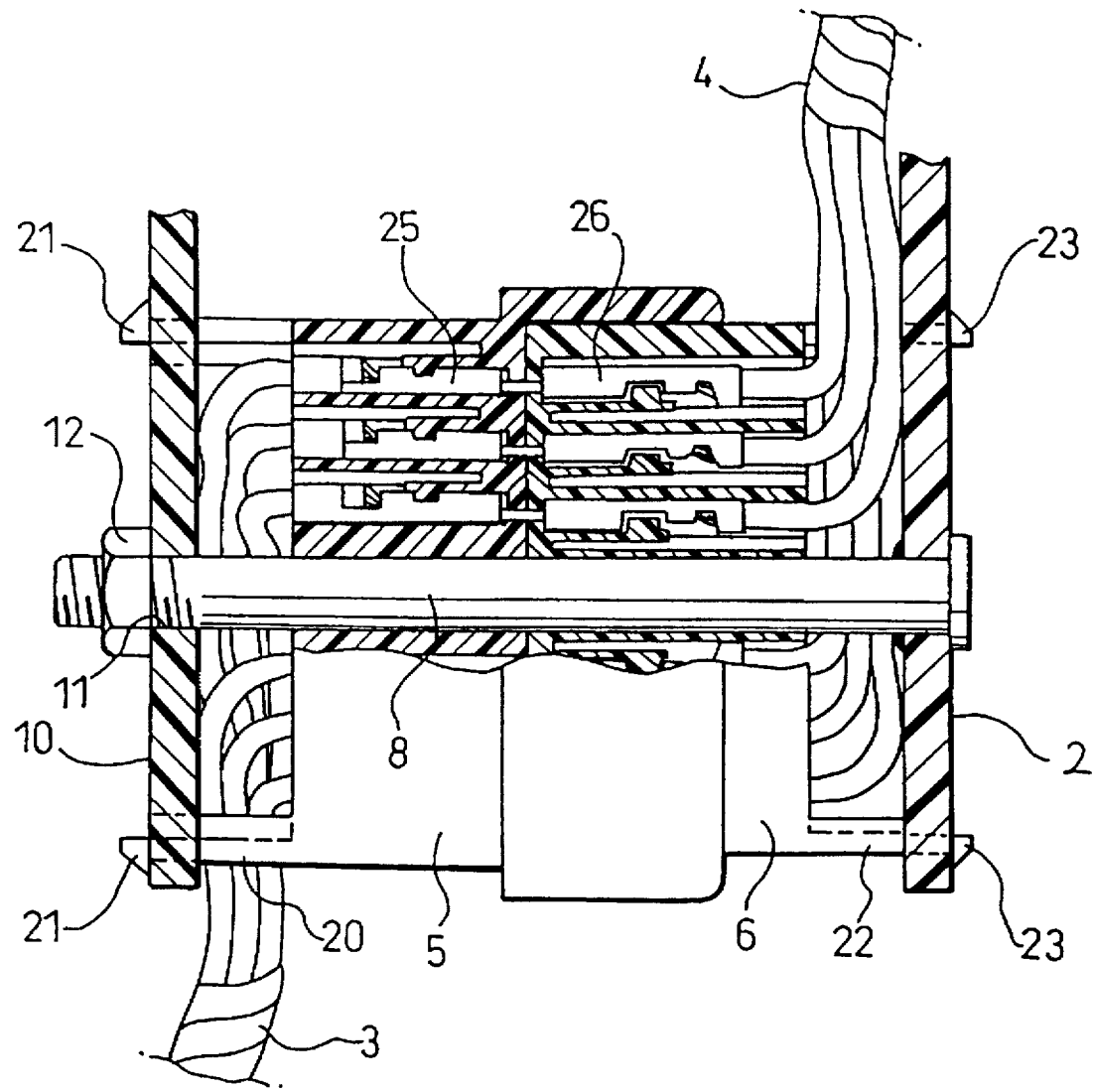
FIG. 3 is a sectional view, with parts cut away, for a description of the connection of the multi-polar connectors shown in FIG. 2.

In joining the instrument panel 1 to the dash board 2, the inserting members (not shown) of the instrument panel 1 are engaged with the dovetail grooves 41 of the guides 40 of the dash board 2 while the guiding insertion bolts 8 are passed through the through-holes of the multipolar connectors 5 and 6. Under this condition, the panel fixing ears 14 of the instrument panel 1 are fastened to the mounting ears 16 of the dash board with screws 15. And as shown in FIG. 3, nuts 12 are engaged with the guiding insertion bolts 8 which are passed through the screw insertion holes 11 of the panel fixing ears 10, so that the instrument panel 1 is joined to the dash board 2 while the multipolar connectors 5 of the wire harness 3 are simultaneously engaged with those 6 of the wires harness 4.

In this operation, the multipolar connectors 5 and 6, which are connected to each other, are centered by the guiding insertion bolts 8; that is, they are prevented from misalignment with each other. Hence, even if the guides 40 protruded from the dash board are fluctuated in dimensional accuracy, the difficulty is eliminated that the connectors 5 and 6 are obliquely engaged with each other, so that they are not positively engaged with each other. Hence, with the wire harness device of the invention, the instrument panel is smoothly joined to the dash board.

Accordingly, the work of engaging the multipolar connectors 5 and 5 of the wire harness 3 on the panel side with the multipolar connector 6 and 6 of the wire harness 4 on the body side is simplified, and in the case where the instrument panel 1 is automatically joined to the dash board with a mechanical device, the connectors 5 and 6 are positively engaged with each other.

As was described above, the multipolar connectors 5 and 6 have the legs 20 and 22 on their backs, respectively. Hence, when the multipolar connectors 5 and 6 are located between the instrument panel 1 and the dash board 2, as shown in FIG. 3 spaces are provided between the backs (rear ends) of the connectors and the instrument panel 1 and the dash board 2 which are large enough to lay electrical wires connected to the male terminals 25 and the female terminals 26 of the multipolar connectors 5 and 6.

Second Embodiment

Another example of the wire harness device will be described with reference to FIGS. 4 and 5.

Figure 4:
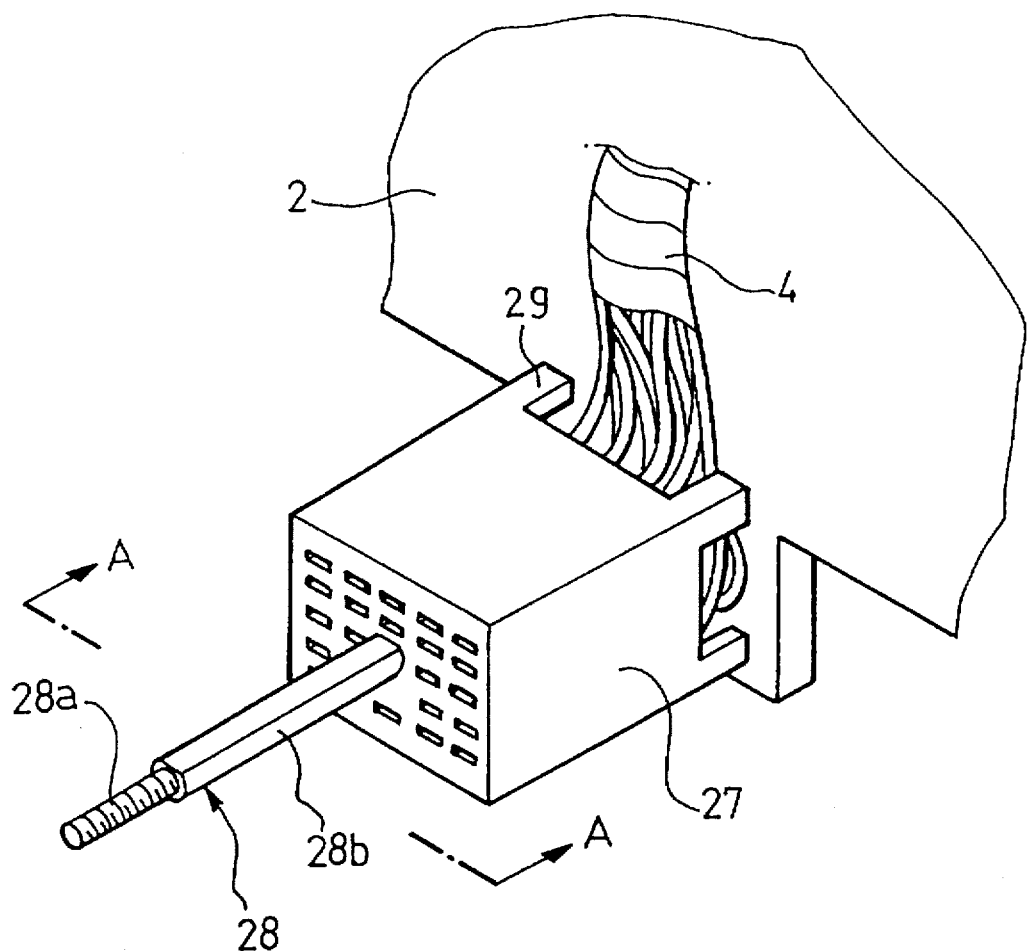
FIG. 4 is an enlarged perspective view showing the connection of a multipolar connector and a guiding insertion bolt in another example of the wire harness device of a second embodiment of the invention.
Figure 5:
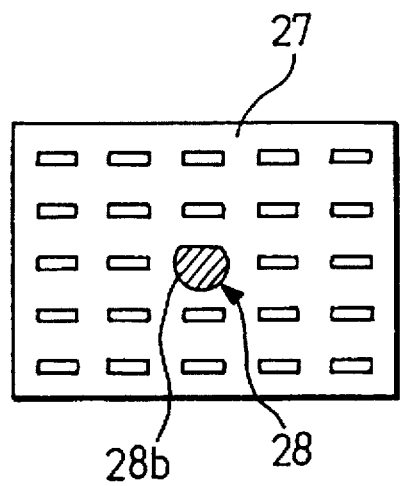
FIG. 5 is a diagram as viewed in the direction of the arrow A in FIG. 4.

As shown in FIG. 4, multipolar connectors (of male type) 27 connected to the ends of the wire harness 4 on the body side which is mounted on the dash board 2 have each four legs 29 on its back, and a through-hole at the center through which a guiding insertion bolt 28 is passed.

The bolt 28 includes an inserting portion 28b nearly semi-circular in section, and a threaded portion 28a extended from the inserting portion 28b. The through-hole of the multipolar connector 27 through which the bolt 28 is passed, is equal in section to the bolt 28. Hence, the multipolar connector 27, through which the bolt 28 is passed, is prevented from being turned around the bolt 28, but is movable along the latter 28. A mating multipolar connector (of female type) (not shown) which is engaged with the above-described multipolar connector 27 has a through-hole which is equal in section to the bolt 28.

The connectors (of male type and female type) are fitted on the bolt 28 in advance so that they are prevented from being turned around the bolt 28. Hence, the connectors are automatically engaged with each other simultaneously when the instrument panel 1 is joined to the dash board 2. That is, in the second embodiment, it is unnecessary to temporarily fix the connectors to the instrument panel 1 and the dash board 2.

In the above-described second embodiment, the guiding insertion bolt 28 and the through-hole formed in the connector are nearly semi-circular; however, the invention is not limited thereto or thereby. That is, the section may be of any configuration except a circle. Furthermore, if the configuration of the section is made asymmetrical, then, in fitting the connectors on the guiding insertion bolt, the connectors are fixed in the direction of movement. This will eliminate the difficulty that connectors to be connected with each other are set erroneously.

For instance, it is not always necessary to provide the inserting members and the guides in the first and second embodiments; that is, they may be eliminated by the use of the guiding insertion bolts.

With the wire harness device of the invention, the connectors of the wire harnesses on the dash board and the instrument panel which are to be engaged with each other are centered by the guiding insertion bolts, being prevented from misalignment with each other. That is, the difficulty is eliminated that the connectors are obliquely engaged with each other, so that they are not positively engaged with each other. Hence, with the wire harness device of the invention, the instrument panel is smoothly joined to the dash board.

Accordingly, the wire harness device of the invention is advantageous in that the engagement of the connectors of the wire harnesses with each other is simplified, and in the case where the instrument panel is automatically joined to the dash board with a mechanical device, the connection of those connectors is achieved positively.

What is claimed is:

1. A wire harness device for an instrument panel of a motor vehicle, comprising:

a first wire harness attached on a dash board, said first wire harness including first connectors;

a second wire harness attached on said instrument panel, said second wire harness including second connectors for mating said first connectors; and guiding insertion bolts extended from one of said dash board and said instrument panel to join said instrument panel to said dash board, said guiding insertion bolts penetrating said first and second connectors, wherein when said instrument panel is joined to said dash board, said first connectors are engaged with said second connectors, simultaneously.

2. The wire harness device of claim 1, wherein said first connectors and said second connectors are mounted respectively on said dash board and said instrument panel before said instrument panel is joined to said dash board.

3. The wire harness device of claim 1, wherein said first connectors and said second connectors are prevented from being turned around said guiding insertion bolts.

4. The wire harness device of claim 1, further comprising inserting members provided on one of said dash board and said instrument panel, and receiving members engaged with said inserting members and formed on another of said dash board and said instrument panel, wherein said instrument panel is joined to said dash board while said inserting members being engaged with said receiving members.

5. The wire harness device of claim 1, wherein a shape of a section of said guiding insertion bolts is a configuration except a circle.

6. The wire harness device of claim 1, wherein through-holes for receiving said guiding insertion bolts formed in said first and second connectors, respectively.

7. The wire harness device of claim 6, wherein a shape of each of said guiding insertion bolts and said through-holes is partially circular and includes a linear portion.

8. The wire harness device of claim 6, wherein a shape of each of said guiding insertion bolts and said through-holes is non-circular.

* * * * *